No. 677,026. Patented June 25, 1901.
F. W. GARRETT.
ELECTRIC BRAKE.
(Application filed Oct. 24, 1900.)

(No Model.) 3 Sheets—Sheet 1.

WITNESSES: INVENTOR
F. W. Garrett,
BY Geo. H. Parmelee,
his ATTORNEY.

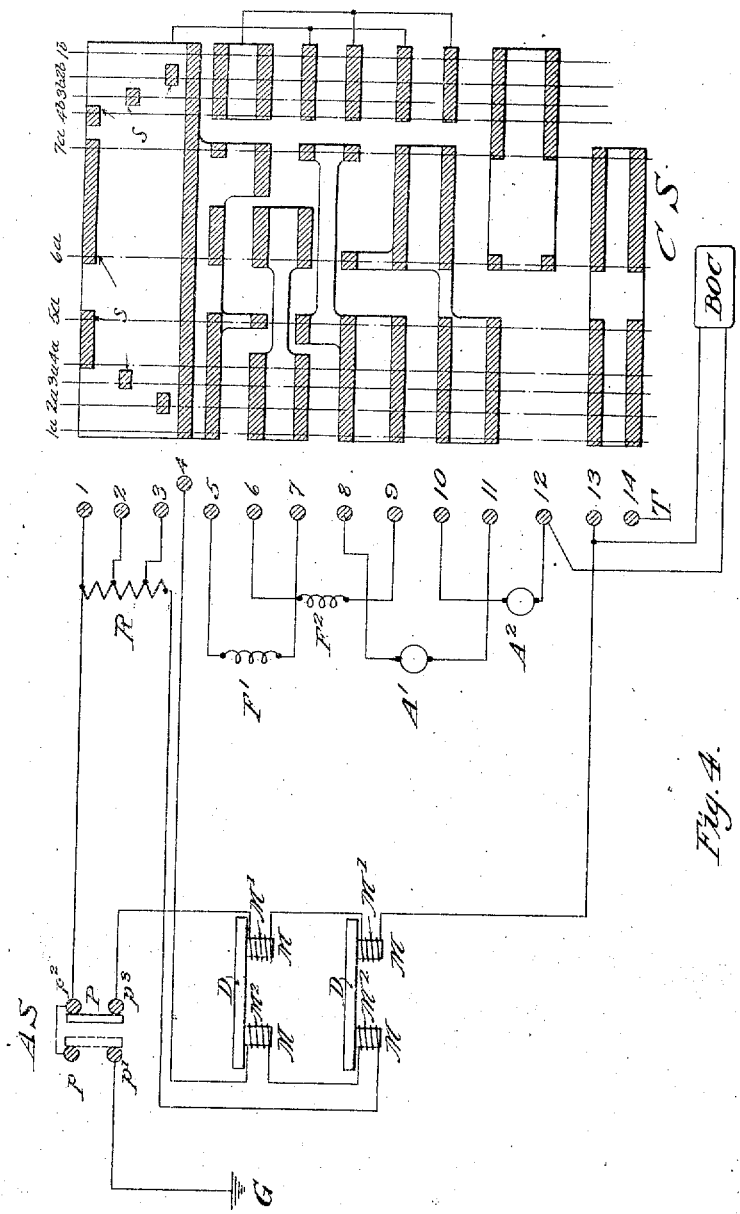

No. 677,026. Patented June 25, 1901.
F. W. GARRETT.
ELECTRIC BRAKE.
(Application filed Oct. 24, 1900.)
(No Model.) 3 Sheets—Sheet 3.

WITNESSES:

INVENTOR
F. W. Garrett,
BY
Geo. H. Parmelee,
his ATTORNEY.

UNITED STATES PATENT OFFICE.

FRANK W. GARRETT, OF JOHNSTOWN, PENNSYLVANIA, ASSIGNOR TO THE LORAIN STEEL COMPANY, OF PENNSYLVANIA.

ELECTRIC BRAKE.

SPECIFICATION forming part of Letters Patent No. 677,026, dated June 25, 1901.

Application filed October 24, 1900. Serial No. 34,231. (No model.)

*To all whom it may concern:*

Be it known that I, FRANK W. GARRETT, of Johnstown, in the county of Cambria and State of Pennsylvania, have invented a new and useful Improvement in Electric Brakes, of which the following is a full, clear, and exact description, reference being had to the accompanying drawings, which form a part of this specification.

My invention has relation to electric brakes for electric-railway cars, and more particularly to that class of brakes in which the car-motors are connected to run as generators in a local circuit driven by the momentum of the moving car, the energy of which is in this manner consumed, the current generated being also used in whole or part in the application of friction braking devices.

The invention is designed to provide a simple and efficient braking arrangement of this class; and it consists in the combination, with a motor or motors and a suitable controlling-switch for connecting the same to run as generators in a local circuit, of an improved electromagnetic friction-brake arranged to be actuated by the current generated in said local circuit and to operate directly upon the motor shaft or shafts. The circuit connections of the energizing-coils of this brake are controlled by the said switch, which may be arranged to provide for their energization and the resultant frictional braking effort at the time the motors are first connected in the local circuit or not until after the speed of the car has been somewhat reduced.

My invention also consists in the novel construction, arrangement, and combination of parts, all as hereinafter described, and pointed out in the appended claims.

Figure 2:
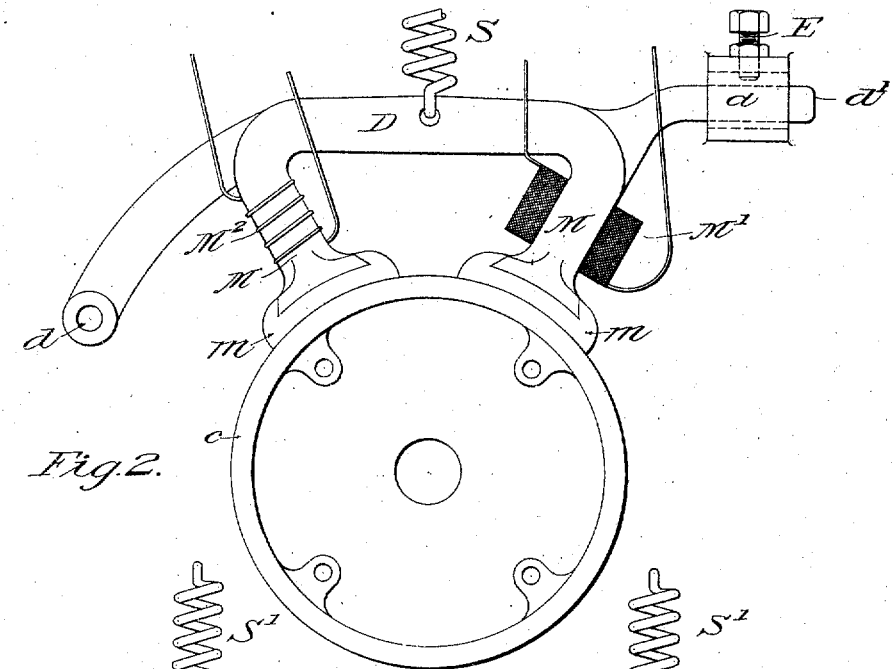
Figure 3:
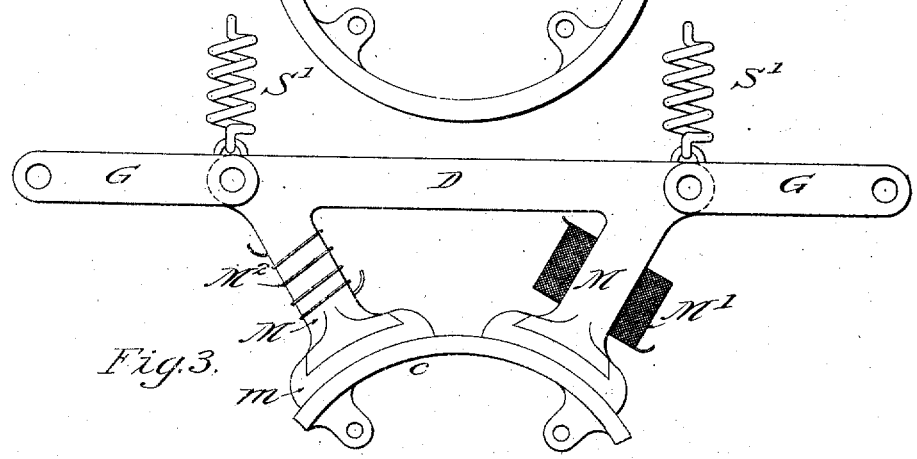
Figure 1:
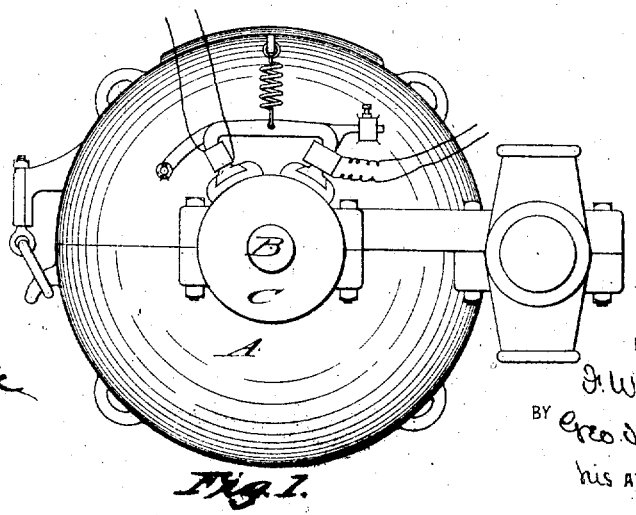
Figure 5:
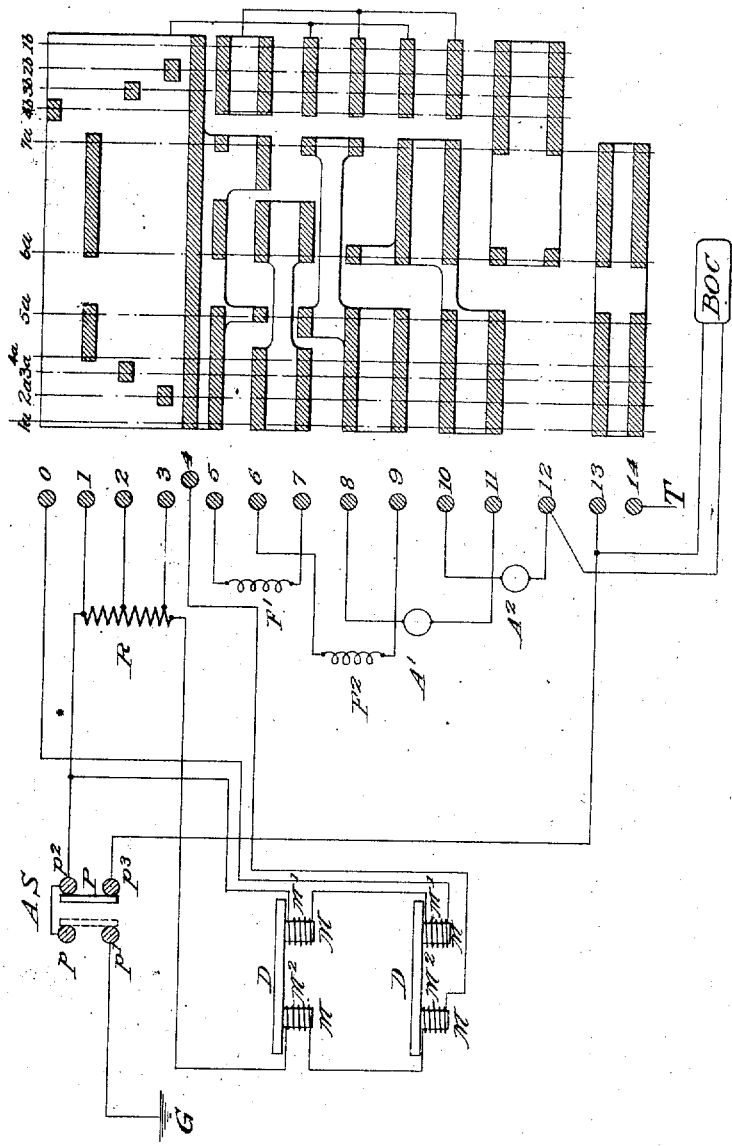

In the accompanying drawings, Figure 1 is an end elevation of a railway electric motor, showing my improved electromagnetic brake applied thereto. Fig. 2 is a detail view of the brake on a larger scale. Fig. 3 is a similar view showing a modification. Fig. 4 is a diagram showing one arrangement of circuits which may be employed in the use of my invention with two motors, and Fig. 5 is a similar view showing a somewhat different circuit arrangement.

The letter A designates the frame or casing of a railway electric motor, and B its armature-shaft. C is a brake member which is rigidly secured on the said shaft in the form of a circular disk or wheel having a peripheral braking-surface, which preferably consists of a detachable rim $c$, which can be readily removed and replaced when worn.

M indicates brake-magnets having pole-pieces $m$, in the form of shoes which are adapted to the peripheral surface of the brake member C. The cores of these magnets are carried by a bar D, of magnetic material, and in the arrangement shown one of these cores is wound with a large coil M' and the other one with a few turns of wire M². The bar D is pivoted at $d$, and its other end has an extension $d'$, which engages a loop $a$ on the motor-frame or other suitable support and is engaged by a screw E, by means of which it may be adjusted against the action of a retracting-spring S. The coil M' is connected in the local circuit of the car-motors when the latter are running as generators and is energized by the current generated in said circuit, thereby establishing a magnetic circuit which includes its pole-piece, the brake member C, the pole-piece and core of the other magnet, and the portion of the bar D which connects the two magnets. This circuit is closed, with the exception of the short air-gaps between the pole-pieces $m$ and the braking member C, and as the bar D is movable the said pole-pieces are drawn into braking contact with the surface $c$. The coil M² may be made to assist in this action; but its principal function is to neutralize residual magnetism when the coil M' is deënergized, and thus permit the spring S to retract the bar D.

In the modification shown in Fig. 3 the bar D is supported by links G and two retracting-springs S'.

This brake may be connected in any suitable circuit, and the circuit arrangements shown in Figs. 4 and 5 merely illustrate two practical arrangements out of many. In Fig. 4, CS indicates a combined power and brake controlling switch for two motors, whose field-coils are designated F' and F², respectively, and their armatures A' A², respectively. This controller has the usual drum carrying a plurality of contacts S, which coöperate with the stationary contact-fingers 1, 2, 3, 4, 5, 6, 7, 8, 9, 10, 11, 12, 13, and 14 in the seven running positions indicated by the vertical lines $1^a$, $2^a$, $3^a$, $4^a$, $5^a$, $6^a$, and $7^a$ to regulate the power and speed of the motors, and in the four positions $1^b$, $2^b$, $3^b$, and $4^b$ to connect the motors in a closed local circuit to run as generators. The drum CS is turned in one direction from its open circuit or off position for the positions $1^a$ to $7^a$, inclusive, and in the opposite direction for the positions $1^b$ to $4^b$, inclusive. AS is an auxiliary switch whose movable member P is automatically shifted from engagement with the contacts $p$ $p'$ to engagement with the contacts $p^2$ $p^3$ when the drum is turned to its braking positions, and back again when the drum is turned to its power positions. As this switch forms no part of my present invention and is merely incident to the particular controller illustrated, I have not shown its mechanical construction and operating devices. Its function, as will readily appear from the diagram, is to provide a return or ground connection in the power positions of the switch and to break such connection and close the local circuit of the motors through the rheostats R and brake-magnets M' when the drum is turned to braking positions.

M' $M^2$ designate the brake-magnet coils, the coils M' of both motors being connected in series with each other between the blow-out coil BOC of the controller and the auxiliary switch AS. The coils $M^2$ are connected in series with each other and with the rheostats R.

It will be readily seen from the diagram that in all the power positions of the controller the circuit through the brake-magnets $M^2$ is open at the switch AS. When, however, the controller is moved to its first brake position and the switch member P is shifted to engage the contacts $p^2$ $p^3$, these magnets are included in the closed local circuits of the motors. This circuit is from the brushes of the armatures in multiple to the blow-out coil, thence to and through the magnets M', thence to and through switch AS, thence to and through resistance R and coils $M^2$ in series, thence through the field-coils of the motors in multiple, and back to the negative brushes of the motors. In passing successively through positions $2^b$, $3^b$, and $4^b$ successive sections of the resistance R are short-circuited, so that at position $4^b$ there is no external resistance in the circuit. When the controller-switch is turned to its first power position, the current in the coils $M^2$ is reversed in direction and residual magnetism in the brake-magnets is thereby neutralized. The circuit arrangement shown in Fig. 5 differs from that shown in Fig. 4 in that the magnet-coils M' are not actively included in the local circuit until position $4^b$ is reached—that is to say, the braking effort of the motors running as generators is alone used to slow down the car, and the brake-shoes are brought into action only to bring the car to a full stop. In the arrangement shown in this figure when the switch CS is turned to the first braking position $1^b$ the circuit is as follows: From the positive brushes of the armatures A' $A^2$ to and through the blow-out coil BOC, thence to and through switch AS, thence through resistance R and magnets $M^2$ to contact-finger 4, thence through the fields of the motors in multiple to the negative brushes of the armatures. In position $2^b$ the circuit is the same as in position $1^b$ with the exception of the fact that contact-finger 3 has become engaged with a contact on the switch-drum CS, and thereby short-circuits one section of the resistance and also the magnets $M^2$. At position $3^b$ a second section of the resistance is short-circuited by the engagement of contact-finger 2, and at position $4^b$ the entire resistance is short-circuited, and the current passes from the switch AS through the magnet-coils M', and thence to contact-finger 5, which in this position is engaged with a contact of the said drum. It will therefore be seen that the effect of turning the switch CS through its several braking positions is first to gradually remove from circuit the resistance R and in the last position to entirely remove said resistance and connect the braking-coils in circuit instead.

The brake member C may, if desired, be made of copper in order to increase the braking effort by taking advantage of the resulting induced current.

By causing the brakes to be applied directly to the armature-shafts of the motors I gain the advantage of utilizing the reduction-gearing between the motors and the car-axles to multiply the braking effort to the axles. My invention is, however, applicable directly to the car-axles or to counter-shafts between the axles and motors, if desired. Nor do I wish to limit myself to the minor mechanical details herein shown and described, since these may be varied without departing from the spirit and scope of my invention.

Having thus described my invention, what I claim, and desire to secure by Letters Patent, is—

1. In an electromagnetic brake, the combination of a rotary brake member, a bar of magnetic material capable of a movement toward and away from the periphery of said brake member, and having pole-pieces which form shoes for contact with said surface, coils on one of the said pole-pieces, means for energizing said coils, means for sending a reverse current around the other of said pole-pieces, and a spring tending to hold said bar away from said brake member.

2. In a brake of the character described, the combination of a motor, a brake member on the armature-shaft thereof, a bar of magnetic material supported to have a limited movement toward and away from the said brake member, said bar having two magnet-cores formed with pole-pieces adapted for frictional contact with said brake member, coils on the said cores, a spring connected to said bar to hold it away from the brake member, and means for sending a reverse current through one of the said coils.

3. In a brake of the character described, the combination with a rotary member having a peripheral braking-surface, a pivoted magnet-carrier, having pole-pieces provided with shoes adapted to said braking-surfaces and normally separated therefrom by short air-gaps, coils on said pole-pieces, circuit connections for said coils, and means for adjusting said bar to vary the length of the said air-gaps.

4. In an electric brake, the combination with the car-motors, braking members on the armature-shafts of said motors, and movable brake-magnets having pole-pieces for contact with said members, of suitable switch and circuit connections for closing a closed local circuit through said motors and brake-magnets, and means also controlled by said switch for destroying the residual magnetism of said magnets.

5. In an electric brake, the combination with the car-motors, brake members on the armature-shafts of said motors, movable brake-magnets having pole-pieces adapted for frictional contact with said brake member, and resistance for connection in circuit with the motors, of a switch having contacts and connections for connecting said motors in a closed local circuit with said resistance and by further movement thereof, to gradually remove said resistance from, and connect the brake-magnets in the said circuit.

6. In an electric brake, the combination with electric motors brake-magnets, and resistance for connection in circuit with said magnets, of switch mechanism having contacts for connecting the motors in a closed local circuit including said resistance, and by further movement thereof to gradually remove said resistance and connect the brake-magnets in said circuit.

In testimony whereof I have affixed my signature in presence of two witnesses.

FRANK W. GARRETT.

Witnesses:
CORA G. COX,
H. W. SMITH.